(12) United States Patent
Srinivasan et al.

(10) Patent No.: US 10,701,124 B1
(45) Date of Patent: Jun. 30, 2020

(54) HANDLING TIMESTAMP INACCURACIES FOR STREAMING NETWORK PROTOCOLS

(71) Applicant: Microsoft Technology Licensing, LLC, Redmond, WA (US)

(72) Inventors: Sriram Srinivasan, Sammamish, WA (US); Soren Skak Jensen, Vancouver (CA); Koen Bernard Vos, Singapore (SG)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/216,513

(22) Filed: Dec. 11, 2018

(51) Int. Cl.
*H04L 29/06* (2006.01)

(52) U.S. Cl.
CPC ......... *H04L 65/608* (2013.01); *H04L 65/607* (2013.01); *H04L 65/80* (2013.01); *H04L 69/28* (2013.01)

(58) Field of Classification Search
None
See application file for complete search history.

(56) References Cited

U.S. PATENT DOCUMENTS

| | | |
|---|---|---|
| 6,680,955 B1 | 1/2004 | Le |
| 6,687,752 B1 | 2/2004 | Falco |
| 7,558,869 B2 | 7/2009 | Leon |
| 7,596,488 B2 | 9/2009 | Florencio |
| 7,783,482 B2 | 8/2010 | Janiszewski |
| 8,867,628 B2 | 10/2014 | Ozawa |
| 9,473,677 B2 | 10/2016 | Ren |
| 2004/0218633 A1 | 11/2004 | Burzynski |
| 2005/0265338 A1 | 12/2005 | Chapman et al. |
| 2008/0159240 A1 | 7/2008 | Hamilton |
| 2018/0227080 A1* | 8/2018 | Stein ..................... H04J 3/0697 |

FOREIGN PATENT DOCUMENTS

| | | | | |
|---|---|---|---|---|
| EP | 2383953 A2 | | 11/2011 | |
| JP | 2008199606 A | * | 8/2008 | ......... H04L 43/0829 |
| JP | 5300278 B2 | * | 9/2013 | ......... H04L 43/0829 |

OTHER PUBLICATIONS

Damnjanovic et al., "A Real-Time Framework for Video Time and Pitch Scale Modification," In *Journal of IEEE Transactions on Multimedia*, vol. 12, Issue 4, pp. 247-256, Jun. 2010.
Singh, "Explaining the Real-Time Transport Protocol of SRTP for WebRTC," <https://www.callstats.io/blog/2018/04/12/explaining-the-real-time-transport-protocol-of-s . . . > 9 pages, Apr. 12, 2018 (accessed Nov. 30, 2018).
"International Search Report and Written Opinion Issued in PCT Application No. PCT/US19/064339", dated Mar. 13, 2020, 15 Pages.

* cited by examiner

*Primary Examiner* — Jeffrey R Swearingen
(74) *Attorney, Agent, or Firm* — Klarquist Sparkman, LLP

(57) ABSTRACT

Techniques are described for determining corrected timestamps for streaming data that is encoded using frames with a variable frame size. The streaming data is encoded into frames and transmitted in network packets in which the network packets or frames are associated with timestamps incremented in fixed steps. When a network packet is received after a lost packet, a corrected timestamp range can be calculated for the received packet based at least in part on the received timestamp value and attributes of the received network packet along with buffering characteristics.

20 Claims, 9 Drawing Sheets

HANDLING TIMESTAMP INACCURACIES FOR STREAMING NETWORK PROTOCOLS

BACKGROUND

Real-time communication services are used to communicate audio, video, and other types of streaming data via a computer network, such as the internet. Real-time communication services rely on the reliable and timely delivery of network packets in order to provide a positive user experience. For example, if a real-time audio communication service that is used for an audio call is experiencing network issues (e.g., lost or late network packets), then the quality of the communication can suffer.

Timing information is also important for real-time communication services Timing information is needed, for example, to manage aspects of network packet reception and playback. Without accurate timing information, reliable and accurate playback of streaming media can be affected (e.g., latency problems, playback synchronization problems, etc.).

Therefore, there exists ample opportunity for improvement in technologies related to handling timestamp inaccuracies for streaming network protocols.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are described for determining corrected timestamps for streaming data that is encoded using frames with a variable frame size. The streaming data is encoded into frames and transmitted in network packets in which the network packets or frames are associated with timestamps incremented in fixed steps. When a network packet is received after a lost network packet, a corrected timestamp range can be calculated for the received network packet based at least in part on the received timestamp value and attributes of the received network packet along with buffering characteristics.

For example, a computing device can perform operations for determining corrected timestamp ranges for streaming data, where the streaming data is encoded using frames with a variable frame size. The operations can comprise receiving a network packet comprising a received timestamp value and a frame of streaming data, where the received timestamp value has a fixed timestamp increment. The operations can further comprise determining that a preceding network packet, comprising a preceding frame of streaming data, has been lost. The operations can further comprise calculating a possible buffer size range in relation to the received network packet, where the possible buffer size range is for an encoding buffer used to encode the streaming data. The operations can further comprise calculating a corrected timestamp range for the received network packet based at least in part on the received timestamp value and the possible buffer size range. The operations can further comprise adjust a jitter buffer based on the corrected timestamp range.

As described herein, a variety of other features and advantages can be incorporated into the technologies as desired.

DETAILED DESCRIPTION

Overview

Figure 1:
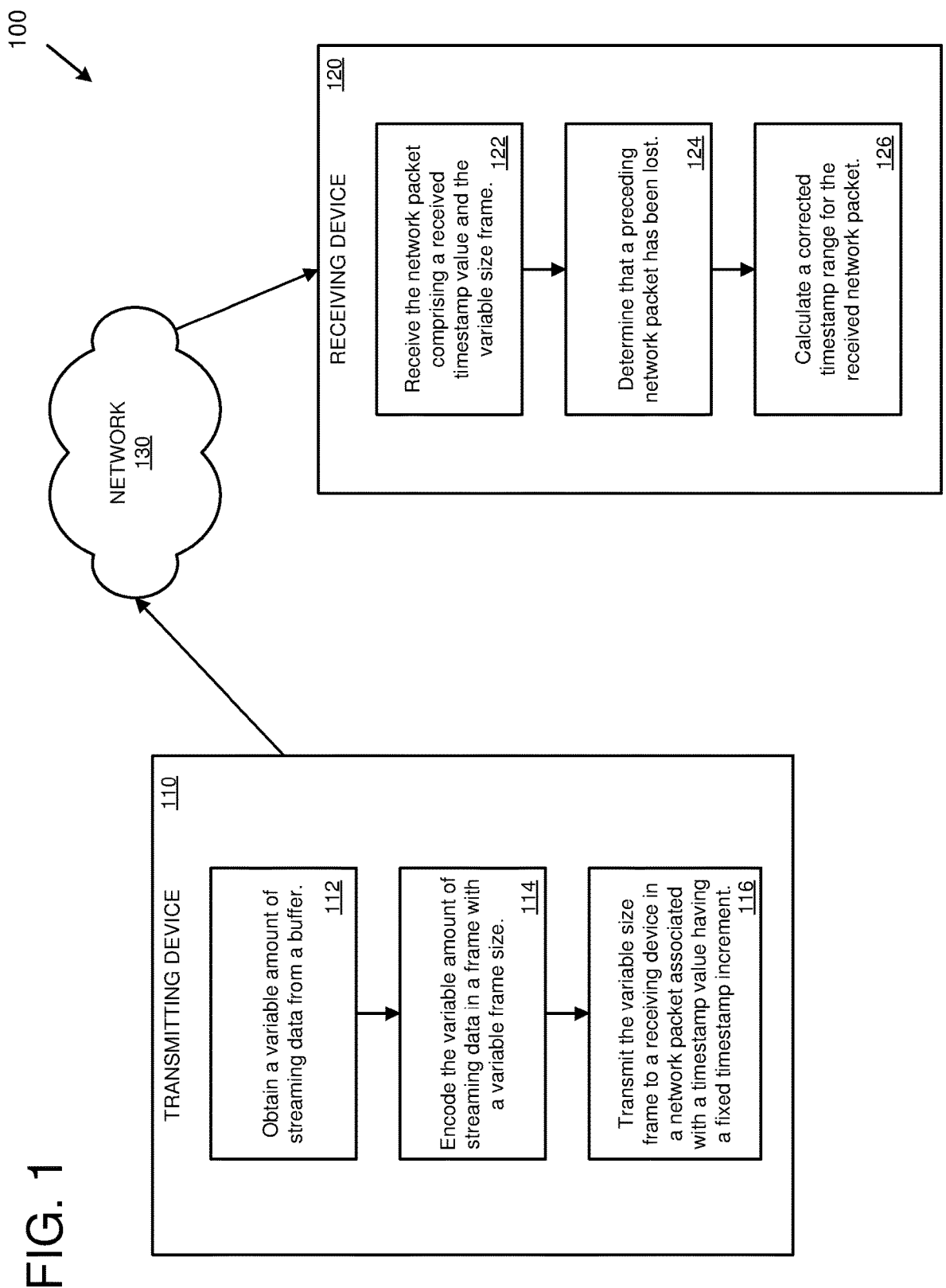
FIG. 1 is a diagram depicting an example environment for determining corrected timestamp ranges for streaming data using variable size frames.

As described herein, various techniques and solutions can be applied for determining corrected timestamps (e.g., corrected timestamp ranges and/or specific corrected timestamp values) for streaming data that is encoded using frames with a variable frame size. The streaming data described herein can be any type of streaming data, such as streaming audio data, streaming video data, or streaming multimedia data (e.g., comprising audio, video, graphics, etc.). The streaming data is encoded into frames and transmitted in network packets from a transmitting computing device to a receiving computing device using a network protocol. The frames of streaming data are associated with timestamps that are incremented in fixed steps. For example, each frame of streaming data can increment a timestamp value by a fixed step (also called a fixed timestamp increment), such as 20 milliseconds (ms). However, because the streaming data is encoded using frames with a variable frame size, the amount of streaming data in a given frame can be different from the fixed timestamp increment. For example, a first frame of streaming data could have 16 ms of data (e.g., 16 ms of audio samples) while a second frame of streaming data could have 28 ms of data (e.g., 28 ms of audio samples). However, if the fixed timestamp increment is 20 ms, then the reported timestamp values (e.g., the timestamp values reported in the network packet header) would be in increments of 20 ms (e.g., 20 ms for the first frame and 40 ms for the second frame).

The difference between the actual amount of streaming data in the frames and the fixed increment timestamp values can cause problems during playback of the streaming media. For example, it can be important for a receiving device (e.g., for a decoder or playback component of the receiving device) to have fairly accurate timestamp information to manage latency (e.g., via controlling a jitter buffer), for error concealment, and for other reasons. Because the frames of streaming data used in the technology described herein have a variable frame size, the receiving device will not know how much streaming data has been lost if a network packet is lost. While the receiving device may know that a network packet has been lost (e.g., via a sequence value in the network packet header of a subsequently received network packet), the receiving device will not know exactly how much streaming data was in the lost network packet. This is because the timestamp value received by the receiving device is in a fixed timestamp increment and does not accurately reflect the correct timestamp value, which depends on the actual amount of streaming data in the lost packet.

The technologies described herein can be applied to determine a corrected timestamp range (a timestamp range that more accurately reflects the true timestamp) in the event of a lost network packet and in which streaming data is using a fixed timestamp increment. The corrected timestamp range can be calculated based upon characteristics of how the buffering is performed for the streaming data. The buffering characteristics can include the amount of streaming data that is encoded by the transmitting device for a given frame and how much streaming data is remaining in the buffer to be encoded in the next frame. For example, a network packet can be received where the network packet comprises a received timestamp value (using a fixed timestamp increment) and a frame of streaming data. It can then be determined that a preceding network packet has been lost (e.g., based upon the sequence number of the received network packet). In response to determining that the preceding network packet has been lost, a possible buffer size range can be calculated in relation to the received network packet. Then, a corrected timestamp range can be calculated for the received network packet based at least in part upon the received timestamp value and the possible buffer size range. The corrected timestamp range (e.g., the range itself and/or a specific corrected timestamp value selected from the range) can be used to control streaming, decoding, and/or playback aspects of the streaming data (e g, managing latency, packet loss concealment, etc.).

In some implementations, the streaming data is encoded and transmitted from the transmitting device to the receiving device according to the real-time transport protocol (RTP). RTP is a network protocol for streaming audio and/or video data using internet protocol (IP) networks. RTP contains a timestamp field in its network packet header which indicates the timestamp of the beginning of the streaming data carried within the RTP packet. When using RTP, the technologies herein use a fixed timestamp increment, which in some implementations is 20 ms. Therefore, in such implementations, the RTP timestamp value will be incremented by the fixed timestamp increment for each frame in the packet. For example, if each packet contains one frame of streaming data and the fixed timestamp increment is 20 ms, then the first RTP packet would have an RTP timestamp value of 0 ms (the beginning of the streaming data), the second RTP packet would have an RTP timestamp value of 20 ms, the third RTP packet would have an RTP timestamp value of 40 ms, and so on. As another example, if the fixed timestamp increment is 20 ms, then an RTP network packet with three frames of audio data will increment the timestamp value by 60 ms.

In other solutions, a variable timestamp is sent in the network packets (e.g., the real timestamp value reflecting the amount of streaming data in the packet). However, such solutions have a number of issues. For example, the network streaming protocol may specify the use of fixed timestamp increments, and changing its operation can require custom coding and interfere with interoperability. In addition, using the real timestamp value can raise privacy concerns (e.g., it could enable others to gain insight into the content or activity of the streaming data, such as audio content). Furthermore, including the real timestamp in the network packet or frame may use additional bits and therefore increase bandwidth.

The technologies described herein also provide benefits in terms of reliability and efficiency (e.g., of real-time network communications services). For example, not including the real timestamp in the network packet or frame saves bits and network bandwidth, which can also reduce latency. In addition, not including the real timestamp in the network packet or frame improves the security of the communication (e.g., reduces privacy concerns). Finally, in the event of a packet loss (e.g., which can be a likely event) in which timing continuity has been lost, a corrected timestamp range (and a corrected timestamp value as well) can be efficiently calculated using the technologies described herein.

Buffering

In the technologies described herein, streaming data is buffered for encoding (e.g., buffered before being encoded by an audio and/or video codec). Because the streaming data is encoded using a variable frame size (and thus a variable amount of streaming data per frame), there may often be data left in the buffer. For example, typical streaming environments produce a fixed amount of data per unit of time (e.g., a fixed number of audio samples per second, according to the sampling rate being used), which is buffered for encoding. In some implementations, audio data is captured and buffered in 20 ms increments, with 20 ms of audio samples being placed into the buffer every 20 ms. As an example, if an audio codec is encoding 14 ms of audio samples in a frame from a buffer with 20 ms of data, then 6 ms of audio samples will remain in the buffer.

Depending on the encoding technology (e.g., the specific codec) being used, there may be a maximum amount of data left in the buffer after the current frame is encoded. For example, if the codec supports encoding streaming data in 6 ms sub-frames and 20 ms of data is captured each period, then the buffer would always have 2 ms of data left after the first frame of 18 ms is encoded. For the next period, 20 ms of data would be added to the buffer resulting in 22 ms of data to be encoded. The codec would encode a second frame of 18 ms, leaving 4 ms in the buffer. For the next time period, another 20 ms of data would be added to the buffer resulting in 24 ms of data to be encoded. The codec would then encode a third frame having 24 ms, leaving 0 ms in the buffer. Therefore, for this relatively simple example, the minimum amount of data left in the buffer (after a frame is encoded) would be 0 ms and the maximum amount of data left in the buffer (after a frame is encoded) would be 4 ms, and the maximum buffer size range would be [0, 4] ms. The minimum and maximum amount of data left in the buffer (called the maximum buffer size range) can also be determined when the codec can encode different size sub-frames of data (e.g., any amount of audio samples up to 6 ms).

In some implementations, audio data is buffered according to an audio codec that uses a variable frame size and that supports encoding audio according to two modes, a voiced mode (for speech with well defined periodicity) and an unvoiced mode (for sounds with no periodicity). For the voiced mode, frames contain an integer number of pitch cycles (also called pitch lag), with the maximum pitch cycle being 18.8 ms. For unvoiced frames, the number of buffered samples is fixed in multiples of 4 ms. Samples that are left in the buffer are encoded in the next frame. In addition, the mode can change from frame to frame. Because of the buffering, a frame starts early by however many samples were buffered in the previous frame. As a result, the true timestamp differs from the fixed timestamp increment (e.g., 20 ms) by a value in the range:

18.8 ms to 0 ms, if the previous packet ended as voiced
4 ms to 0 ms, if the previous packet ended as unvoiced Sequential Timestamp Range Tracking In the technologies described herein, the maximum amount of streaming data that can remain in the buffer after the current frame is encoded can be used in determining the corrected timestamp range. The equations and operations described in this section are based on an example audio codec that uses variable size frames and that encodes audio data in a voiced mode (encoding samples in pitch cycle increments or sub-frames, with a maximum pitch cycle of 18.8 ms) and an unvoiced mode (encoding samples in 4 ms increments or sub-frames) and that uses RTP. However, these equations and operations are generally applicable to other audio codecs (and to encoding of streaming data in general). For example, encoding of other types of streaming data may not use different types of streaming data or may use more than two types of streaming data. In addition, the fixed timestamp increment may be different for different codecs or encoding technologies. The minimum and/or maximum buffer size may also be different for different codecs or encoding technologies.

As described previously, the maximum amount buffered by the encoder is smaller for unvoiced frames than for voiced frames. The frame duration also tells us something about the buffered amount. For example, if a 35 ms frame is received, then we know that at most 3.8 ms can have been buffered at the end of this frame because otherwise more than 18.8 ms would need to have been buffered for the previous frame. This logic can be combined to track the uncertainty in buffer size across frames, thereby reducing the margin of uncertainty for the true timestamps compared to a single-frame analysis.

The equations below operate on frames, which are the unit of processing in both the encoder and the decoder. Each frame has a nominal length of 20 ms. Each network packet contains one or more frames and has one RTP timestamp value that relates to the first sample of the first frame in the packet. The RTP timestamps sent as part of the RTP header are incremented in multiples of 20 ms, and point to the sample that is a multiple of 20 ms before the end of the available audio data. For frame n, the correct (true) timestamp is related to this fixed increment RTP timestamp, the frame duration, and the encoder buffer size (after processing frame n), through the following relation.

$$\text{true timestamp}(n) = \text{rounded timestamp}(n) + 20 - \text{frame duration}(n) - \text{buffer size}(n)(ms) \quad \text{(Equation 1)}$$

Figure 3:
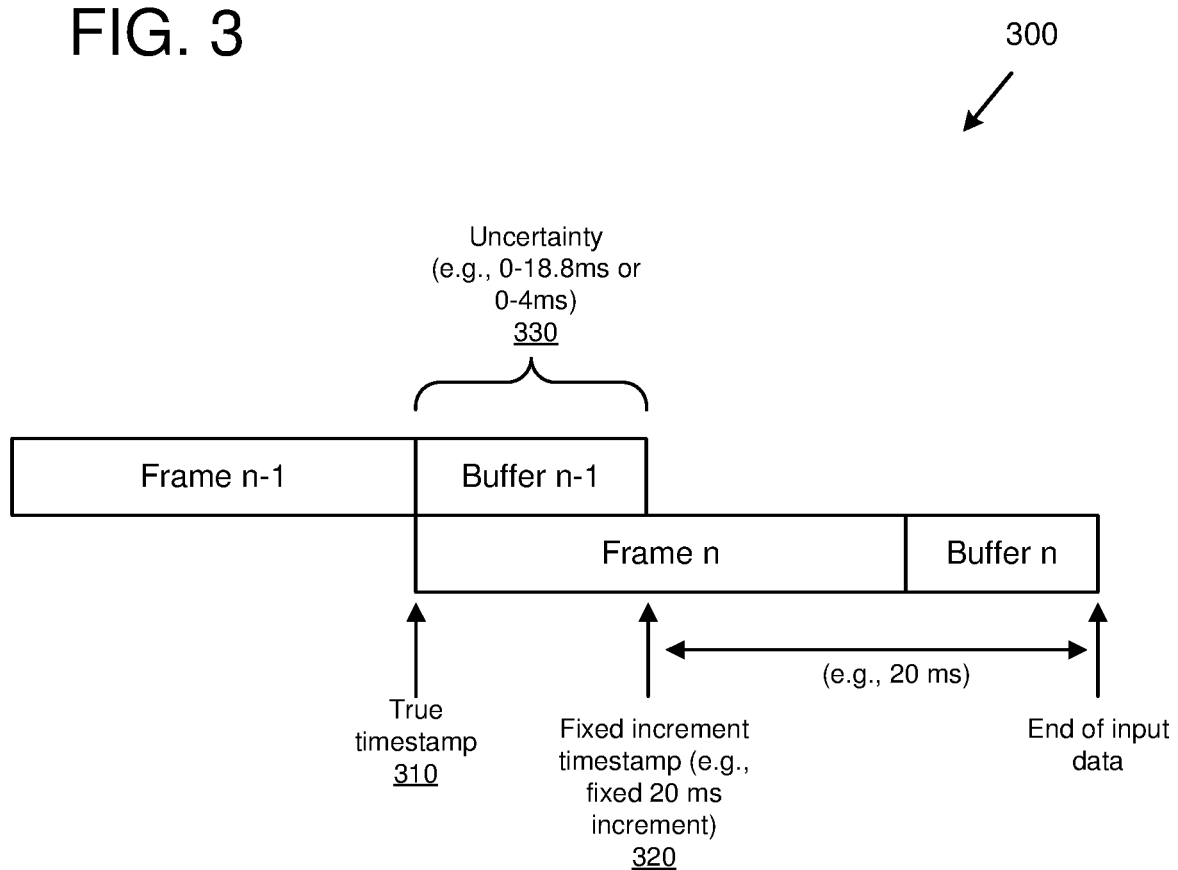
FIG. 3 is a diagram depicting example frames of streaming data along with true timestamps and fixed timestamps.

FIG. 3 illustrates how the frames, buffers, and timestamps of Equation 1 are related. FIG. 3 depicts, at 300, two frames, frame n−1 and frame n. After frame n−1 is encoded, some data remains in the buffer, depicted as buffer n−1. The correct (true) timestamp 310 of frame n−1 reflects the actual amount of streaming data included in frame n−1 (e.g., 12 ms of data). The fixed increment timestamp reflects the timestamp value signaled in the network packet header (e.g., the RTP header), which in some implementations is a multiple of 20 ms. As depicted at 300, the buffer n−1 is encoded in the next frame, frame n. After encoding frame n, there is streaming data in the buffer, indicated by buffer n (which could be a different amount of streaming data than was remaining in buffer n−1). The uncertainty 330 reflects the size of buffer n−1, which in some implementations is 0 ms to 18.8 ms if the previous frame (frame n−2, not depicted) was voiced or 0 ms to 4 ms if the previous frame was unvoiced.

The buffer size for frame n depends on that of frame n−1 according to the following relation.

$$\text{buffer size}(n) = \text{buffer size}(n-1) + 20 - \text{frame duration}(n) \quad (ms) \quad \text{(Equation 2)}$$

Using the knowledge that the maximum buffer size is 4 ms for unvoiced frame and 18.8 ms for voiced frames, the uncertainty range of the timestamps can be expressed recursively as follows. First, if frame n−1 was lost, the maximum possible buffer size range is initialized to:

$$\text{buffer size range}(n-1) = [0, 18.8](ms)$$

Then, for subsequent frames, the intersection of the range propagated from the previous frame (also called the propagated buffer size range) and the range according to the current voicing type is determined as follows. If frame(n) is unvoiced, then the following equation is used.

$$\text{buffer size range}(n) = \text{buffer size range}(n-1) + 20 - \text{frame duration}(n) \cap [0,4](ms) \quad \text{(Equation 3)}$$

If frame(n) is voiced, then the following equation is used.

$$\text{buffer size range}(n) = \text{buffer size range}(n-1) + 20 - \text{frame duration}(n) \cap [0,18.8](ms) \quad \text{(Equation 4)}$$

In general, the technique illustrated in Equations 3 and 4 is used to calculate the possible buffer size range. For example, calculating the possible buffer size range can comprise calculating a propagated buffer size range (corresponding to the "buffer size range (n−1)+20−frame duration (n)" portion of Equations 3 and 4) based at least in part on: a buffer size range for the lost frame and a duration of the received frame, and calculating an intersection of the propagated buffer size range and a maximum buffer size range (corresponding to [0,4] or [0,18.8] in Equations 3 and 4, and which depends on whether the streaming data has different types of data with different maximum buffer size ranges) for the received frame.

Next, the corrected RTP timestamp range is determined using the following equation.

$$\text{true timestamp range}(n) = \text{timestamp}(n) + 20 - \text{frame duration}(n) - \text{buffer size range}(n)(ms) \quad \text{(Equation 5)}$$

In general, the technique illustrated in Equation 5 is used to calculate the corrected timestamp range for the current streaming protocol being used. For example, calculating the corrected timestamp range can comprise adjusting the received timestamp value (corresponding to timestamp (n) in Equation 5) by the fixed timestamp increment (corresponding to 20 in Equation 5), the duration of the received frame (corresponding to frame duration (n) in Equation 5), and the possible buffer size range (corresponding to buffer size range (n) in Equation 5).

As the above equations illustrate, the corrected timestamp range becomes narrower (or stays the same) with each new frame that is received. This occurs until there is a lost network packet and the range is reset.

Figure 4:
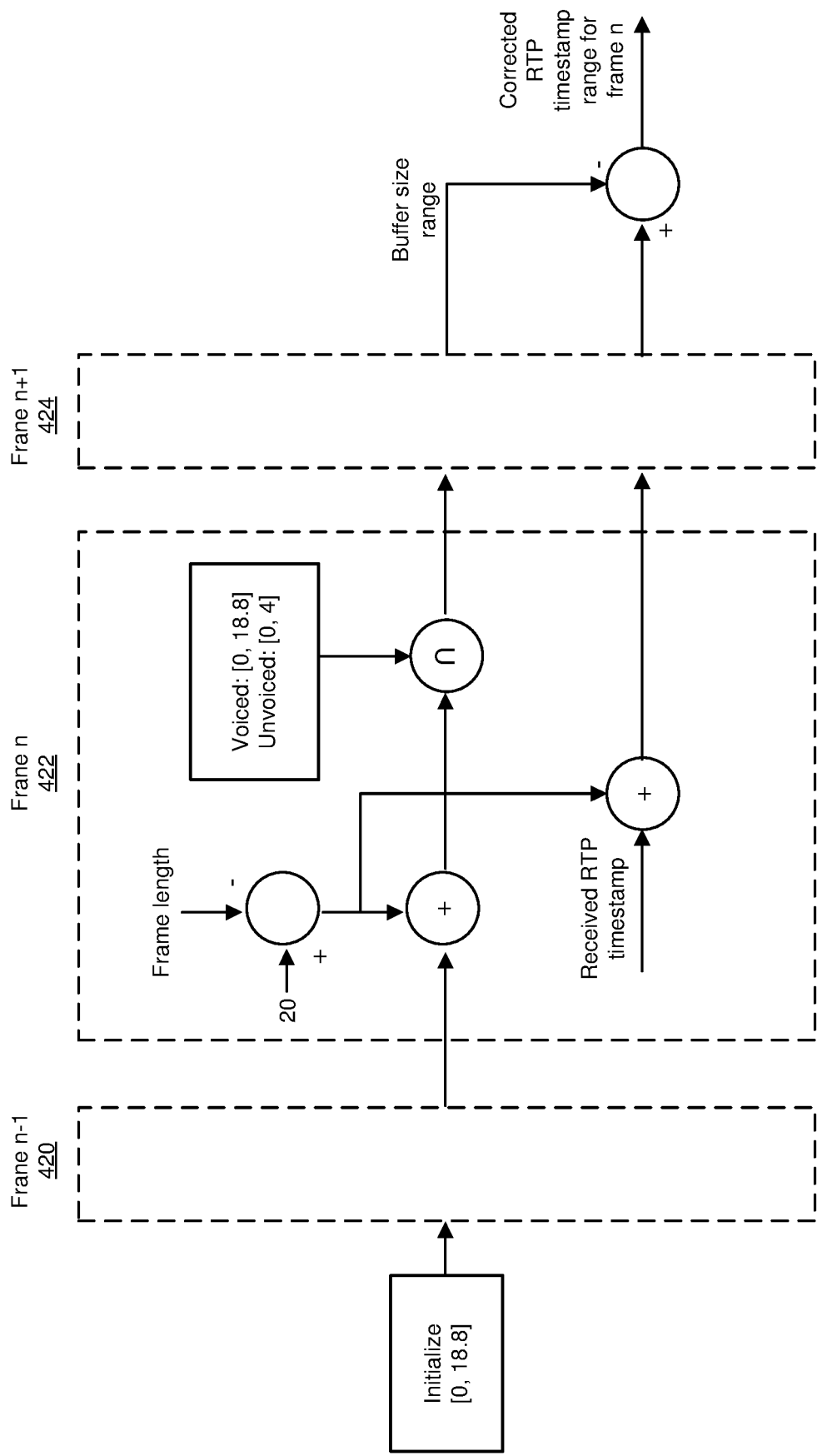
FIG. 4 is a diagram depicting calculation of a corrected timestamp range using past and future frames.

Equations 3, 4, and 5 can be also be applied to the situation where future frames are available. This is illustrated in FIG. 4. The approach is to first compute the buffer size range through the end of the last frame, and then translate this back to the RTP timestamp range at an earlier frame by taking that frame's RTP timestamp, adding the nominal (the fixed timestamp increment) length of all the frames from that frame onward, subtracting the actual length of those frames, and subtracting the final buffer size range. FIG. 4 illustrates these operations for three frames, frame n−1 420, frame n 422, and frame n+1 424. However, this approach can be applied to any number of past and/or future frames.

The following examples illustrate calculation of a corrected timestamp range when a preceding network packet, and corresponding preceding frame of streaming data, have been lost. In the first example, assume packet n−1 has been lost, and packet n is received with a single unvoiced frame of duration 18 ms. Then the buffer size range would be calculated, according to Equation 3, as follows.

$$\text{buffer size range}(n) = [0, 18.8] + 20 - 18 \cap [0, 4]$$
$$= [2, 20.8] \cap [0, 4]$$
$$= [2, 4] \text{ (ms)}$$

Next, the corrected RTP timestamp range would be calculated, according to Equation 5, as follows.

$$\text{true timestamp range}(n) = \text{timestamp}(n) + 20 - \text{frame duration}(n) -$$
$$\text{buffer size range}(n) \text{ (ms)}$$
$$= \text{timestamp}(n) + 20 - 18 - [2, 4]$$
$$= \text{timestamp}(n) + [-2, 0] \text{ (ms)}$$

Therefore, according to the above calculation, the corrected timestamp range (i.e., the true timestamp range) for the current frame n would be the received timestamp (e.g., the RTP timestamp reported in the RTP header, which is a fixed increment timestamp) in the range of −2 ms to 0 ms. As an example, if the received timestamp value is 400 ms, then the corrected timestamp range would be from 398 ms to 400 ms.

In the second example, assume packet n−1 has been lost, and packet n is received with a single voiced frame of duration 35 ms. Then the buffer size range would be calculated, according to Equation 4, as follows.

$$\text{buffer size range}(n) = [0, 18.8] + 20 - 35 \cap [0, 18.8]$$
$$= [-15, 3.8] \cap [0, 18.8]$$
$$= [0, 3.8] \text{ (ms)}$$

Next, the corrected RTP timestamp range would be calculated, according to Equation 5, as follows.

$$\text{true timestamp range}(n) = \text{timestamp}(n) + 20 - \text{frame duration}(n) -$$
$$\text{buffer size range}(n) \text{ (ms)}$$
$$= \text{timestamp}(n) + 20 - 35 - [0, 3.8]$$
$$= \text{timestamp}(n) + [-15, -11.2] \text{ (ms)}$$

Therefore, according to the above calculation, the corrected timestamp range (i.e., the true timestamp range) for the current frame n would be the received timestamp (e.g., the RTP timestamp reported in the RTP header, which is a fixed increment timestamp) in the range of −15 ms to −11.2 ms.

As an example, if the received timestamp value is 400 ms, then the corrected timestamp range would be from 385 ms to 388.8 ms.

Multi-Frame Packets

In the technologies described herein, the technologies described for calculating corrected timestamp ranges can be applied to network packets that contain multiple frames. For multi-frame packets, Equations 3 and 4 can be iterated for all frames in the packet, which provides a buffer size range at the end of that packet. The buffer size range at the end of the packet can then be backtraced to an RTP timestamp range at the start of the packet using a slightly rephrased version of Equation 5 as follows.

true timestamp range=timestamp+20*number of frames in packet−packet duration−buffer size range(ms)    (Equation 6)

For packets with forward error correction (FEC) data, the FEC data can be used to narrow down the buffer size range if the FEC data describes data immediately prior to the main data.

Playout Delay Reporting

In some implementations, the decoder reports the playout delay to a controller (e.g., a controller that manages playback of the streaming data at the receiving device). If the RTP timestamps were exact, this delay would equal the current packet's RTP timestamp, minus the playout timestamp. However, because the technologies described herein use variable size frames and a fixed timestamp increment, the received packet's RTP timestamp has a range of uncertainty. Therefore, some value within the RTP timestamp range can be selected. In some implementations, the most conservative delay is reported, which is the lowest possible delay value within the range of uncertainty (e.g., within the corrected timestamp range). In other implementations, another value is selected within the range of uncertainty.

As a result of the uncertainty in RTP timestamps, there will be some fluctuations in the reported delay. However, this reported delay will naturally fluctuate anyway, as it is sensitive to the time ordering of incoming packets relative to the requests for generating output samples. A packet arriving a fraction of a ms earlier or later can change the reported delay by 20 ms. The controller can be expected to deal with such fluctuations.

Out of Order Packets

In some implementations, a component of the receiving device (e.g., the decoder, controller, or some other component) computes a new corrected timestamp range for each new packet that arrives. As a result, an out of order packet will lead to a reset in the range: if packet n arrives before packet n−1, then it will appear that packet n−1 was lost when computing the range for packet n.

In some implementations, after receiving packet n−1, the corrected timestamp range computation would be resumed based on the history up to packet n−2 and update the range using packets n−1 and n. However, in some implementations, out of order packets are rare enough that this situation is ignored and the range is simply reset with little impact on perceived quality.

Packet Loss Concealment

In some implementations, the playout timestamp points to the next sample to be played out. This timestamp is incremented by the number of generated samples. When a packet arrives after a packet loss, its corrected RTP timestamp range is compared with the playout timestamp. If the playout timestamp is earlier than the middle of the corrected RTP timestamp range, a quantity of concealed sub-frames (e.g., a partial frame of audio samples) are generated (however many are needed) to get as close as possible to the middle of the corrected RTP timestamp range of the received packet. After that, playback is switched to the decoded sub-frames.

If after concealments the playout timestamp is already close to, or beyond, the middle of the corrected RTP timestamp range of the first received packet, generation of concealed sub-frames is stopped, and a switch is made to the decoded sub-frames. In this case the reported playout delay will drop to zero or a negative value. A negative delay is treated as a special case. First that delay is reported to the controller with low cost of action, and the controller is expected to request a delay increase of up to the size of the negative delay. The decoder then increases the delay by simply lowering the playout timestamp by the requested delay increase. If after this delay increase the delay is still negative, the decoder discards sub-frames until the playout timestamp matches the lower end of the corrected RTP timestamp range of the first sub-frame to be played out.

There are two types of concealment: extrapolation, when no future frames are available, and interpolation, between past and future frames. When interpolating, the concealment needs to decide how many sub-frames to insert. If the past and future frames are unvoiced, then it is known that each missing 20 ms frame contained 4 sub-frames. Also, for unvoiced signals the corrected RTP timestamp range is narrow (at most 4 ms), so the difference can be taken between some point in the old and new RTP timestamp ranges. For interpolation between voiced frames, a sequence of pitch lags needs to be found (each pitch lag defining the sub-frame length), such that (1) the interpolated pitch lags evolve smoothly and (2) they fill the estimated RTP timestamp interval. In some implementations, a reasonable point is to use 70% into the corrected RTP timestamp range as an estimate of the true RTP timestamp for both voiced and unvoiced frames.

In some cases, a two-sided extrapolation is used instead of interpolation. This happens if the voicing mode changes from past to future frames, or if there is a large jump in pitch lags between past and future frames. In that case, extrapolation is performed going forward from the past, and also extrapolation going backward from the future. At some point in between, the two extrapolations meet. This point does not necessarily sit halfway between past and future frames, but can be chosen in a signal dependent way.

Environments for Determining Corrected
Timestamp Ranges

FIG. 1 is a diagram depicting an example environment 100 for determining corrected timestamp ranges for streaming data using variable size frames. The example environment 100 depicts a transmitting device 110. The transmitting device 110 can be any type of computing device (e.g., server computer, virtual machine, desktop computer, laptop computer, tablet, phone, or another type of computing device) that encodes and transmits streaming data (e.g., streaming audio and/or video).

As depicted at 112, a variable amount of streaming data is obtained from a buffer. For example, a buffer can be capturing streaming data (e.g., audio and/or video data) as it is being generated (e.g., via a microphone or video capture device). In one example, an amount of streaming data is placed into the buffer on a periodic basis (e.g., every 20 ms, 20 ms worth of audio samples captured from a microphone are placed into the buffer). From the buffer, a variable amount of the streaming data is then selected for encoding and transmission, as depicted at 112. For example, if there is 20 ms of data in the buffer, then up to 20 ms of data can be obtained (e.g., 4 ms, 12.4 ms, 20 ms, or some other amount). The variable amount of the streaming data obtained from the buffer can be determined based on a variety of criteria. For example, if the streaming data is audio, then the amount can vary based on the type of audio data (e.g., if the audio data is periodic, such as voiced data, then the amount of audio data can be determined based on a number of pitch cycles).

As depicted at 114, the variable amount of streaming data is encoded in a frame with a corresponding variable frame size. For example, if 12 ms of audio data is obtained from the buffer, then the 12 ms of audio data is encoded in a frame with a frame size of 12 ms (e.g., having 12 ms worth of audio samples).

As depicted at 116, the variable size frame is transmitted to receiving device 120 in a network packet. The network packet is associated with a timestamp value having a fixed timestamp increment. For example, the frame could be transmitted in a network packet with a timestamp header value having a fixed increment of 20 ms since the previous frame. The network packet can be transmitted to the receiving device 120 via a streaming network protocol, such as RTP or another streaming protocol.

The transmitting device 110 transmits the network packet to the receiving device 120 via a network 130 (e.g., the internet and/or another type of public or private data network). The receiving device 120 can be any type of computing device (e.g., server computer, virtual machine, desktop computer, laptop computer, tablet, phone, or another type of computing device) that receives and decodes streaming data (e.g., streaming audio and/or video).

As depicted at 122, the network packet is received from the transmitting device 110 via the network 130. The received network packet comprises a received timestamp value and the variable size frame. The received timestamp value is the fixed increment timestamp value associated with the network packet or frame. For example, if the network protocol is RTP, then the received timestamp value is the RTP header timestamp value (a multiple of 20 ms or some other fixed increment).

As depicted at 124, a determination is made that the preceding network packet has been lost (the preceding network packet is the network packet immediately prior to the received network packet). The determination that the preceding network packet has been lost can be made based upon the packet sequence numbers (e.g., having received the current network packet with a given sequence number and determining that the preceding network packet with a prior sequence number has not been received). The determination can be made if the lost network packet is not received within a given period of time.

As depicted at 126, a corrected timestamp range is calculated for the received network packet. For example, the corrected timestamp range can be calculated based at least in part on the received timestamp value and a possible buffer size range. In some implementations, the corrected timestamp range is calculated using techniques similar to Equations 3, 4, and 5. The corrected timestamp range can be used (e.g., by a component of the receiving device 120, such as a decoder, controller, playback component, etc.) to control the decoding and/or playback of the streaming data (e.g., to control jitter buffer properties to manage latency).

Figure 2:
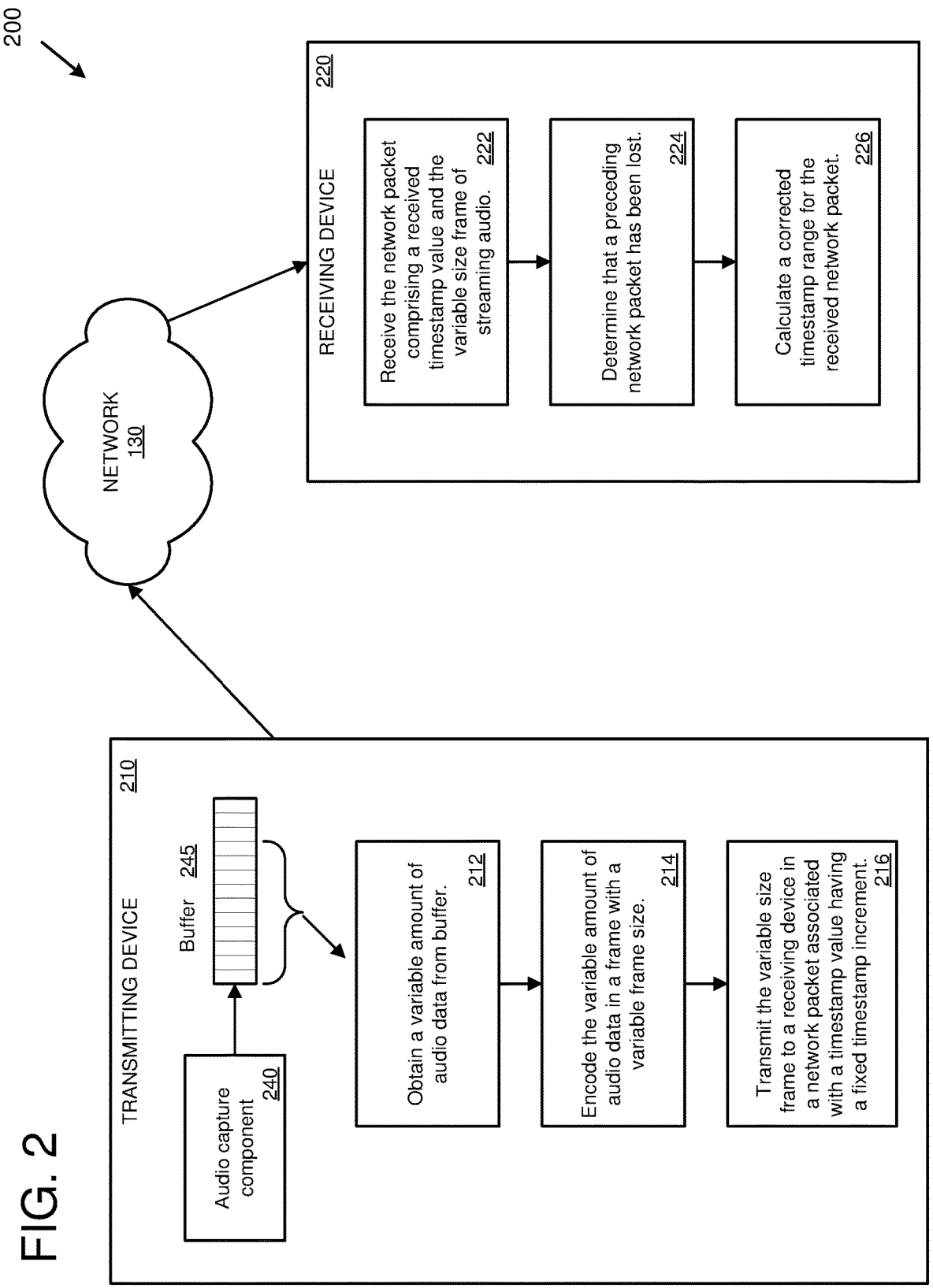
FIG. 2 is a diagram depicting an example environment for determining corrected timestamp ranges for streaming audio using variable size frames.

FIG. 2 is a diagram depicting an example environment 200 for determining corrected timestamp ranges for streaming audio using variable size frames. In some implementations, the example environment 200 can be used for determining corrected timestamp ranges for streaming video and/or other types of streaming media in addition to, or instead of, streaming audio. The example environment 200 depicts a transmitting device 210. The transmitting device 210 can be any type of computing device (e.g., server computer, virtual machine, desktop computer, laptop computer, tablet, phone, or another type of computing device) that encodes and transmits streaming data (e.g., streaming audio and/or video).

An audio capture component 240 (e.g., a microphone) of the transmitting device 210 captures audio and saves it in a buffer 245 on a periodic basis. For example, 20 ms of audio samples can be obtained from the audio capture component 240 and saved in the buffer 245 every 20 ms. In some implementations, the transmitting device 210 can comprise a video capture device and corresponding video buffer.

As depicted at 212, a variable amount of streaming audio is obtained from the buffer 245. For encoding and transmission. For example, if there is 20 ms of data in the buffer, then up to 20 ms of data can be obtained (e.g., 4 ms, 12.4 ms, 20 ms, or some other amount). The variable amount of the streaming audio obtained from the buffer can be determined based on a variety of criteria. For example, the amount can vary based on the type of audio data (e.g., if the audio data is periodic, such as voiced data, then the amount of audio data can be determined based on a number of pitch cycles).

As depicted at 214, the variable amount of streaming audio is encoded in a frame with a corresponding variable frame size. For example, if 12 ms of audio data is obtained from the buffer, then the 12 ms of audio data is encoded in a frame with a frame size of 12 ms (e.g., having 12 ms worth of audio samples).

As depicted at 216, the variable size frame is transmitted to receiving device 220 in a network packet. The network packet is associated with a timestamp value having a fixed timestamp increment. For example, the frame could be transmitted in a network packet with a timestamp header value having a fixed increment of 20 ms since the previous frame. The network packet can be transmitted to the receiving device 220 via a streaming network protocol, such as RTP or another streaming protocol.

The transmitting device 210 transmits the network packet to the receiving device 220 via a network 130 (e.g., the internet and/or another type of public or private data network). The receiving device 220 can be any type of computing device (e.g., server computer, virtual machine, desktop computer, laptop computer, tablet, phone, or another type of computing device) that receives and decodes streaming data (e.g., streaming audio and/or video).

As depicted at 222, the network packet is received from the transmitting device 210 via the network 130. The received network packet comprises a received timestamp value and the variable size frame. The received timestamp value is the fixed increment timestamp value associated with the network packet or frame. For example, if the network protocol is RTP, then the received timestamp value is the RTP header timestamp value (a multiple of 20 ms or some other fixed increment).

As depicted at 224, a determination is made that the preceding network packet has been lost (the preceding network packet is the network packet immediately prior to the received network packet). The determination that the preceding network packet has been lost can be made based upon the packet sequence numbers (e.g., having received the current network packet with a given sequence number and determining that the preceding network packet with a prior sequence number has not been received). The determination can be made if the lost network packet is not received within a given period of time.

As depicted at 226, a corrected timestamp range is calculated for the received network packet. For example, the corrected timestamp range can be calculated based at least in part on the received timestamp value and a possible buffer size range. In some implementations, the corrected timestamp range is calculated using techniques similar to Equations 3, 4, and 5. The corrected timestamp range can be used (e.g., by a component of the receiving device 220, such as a decoder, controller, playback component, etc.) to control the decoding and/or playback of the streaming audio (e.g., to control jitter buffer properties to manage latency).

In some implementations, the example environments 100 and 200 are online real-time communication environments in which audio and/or video information is captured at the transmitting device 110 or 210 and transmitted to the receiving device 120 or 220 for presentation (e.g., as part of a real-time audio and/or video call, conference, meeting, etc.). For example, the online communication environment can comprise a voice over internet protocol (VoIP) service. As part of the communication, the receiving device 120 or 220 could also transmit audio and/or video back to the transmitting device 110 or 210 for presentation (e.g., as part of a two-way audio and/or video call). In addition, a number of other computing device can participate in communication (e.g., in a conference environment).

Methods for Determining Corrected Timestamp Ranges

In any of the examples herein, methods can be provided for determining corrected timestamp ranges for streaming data.

Figure 5:
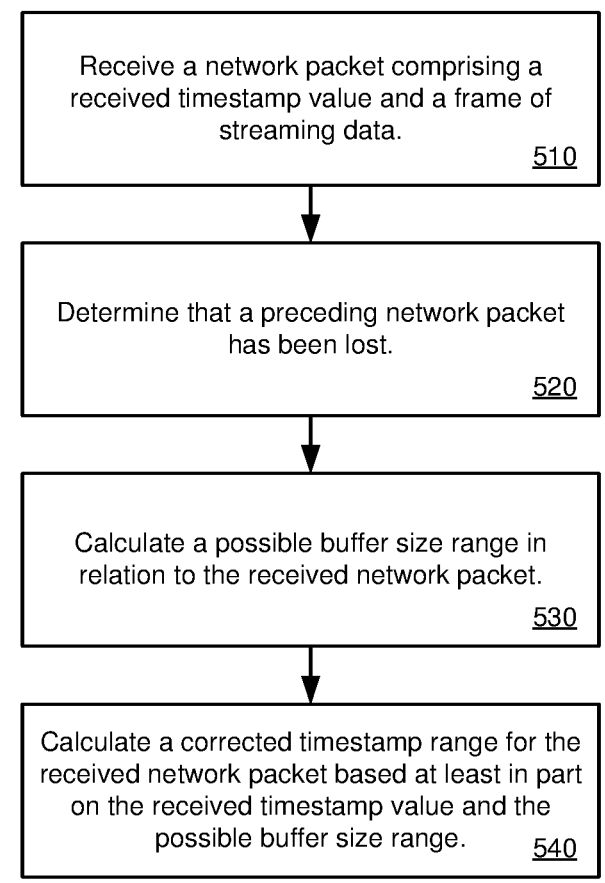
FIG. 5 is a flowchart of an example method for determining corrected timestamp ranges for streaming data.

FIG. 5 is a flowchart of an example method 500 for determining corrected timestamp ranges for streaming data. The streaming data can be transmitted, for example, by a streaming network protocol, such as RTP. For example, the example method 500 can be performed by a computing device, such as receiving device 120 or receiving device 220.

At 510, a network packet is received comprising a received timestamp value and a frame of streaming data. The received timestamp value has a fixed timestamp increment (e.g., an increment of 20 ms or some other fixed value).

At 520, a determination is made that the preceding network packet has been lost. For example, a time period for reception of the preceding network packet has expired.

At 530, a possible buffer size range is calculated in relation to the received network packet. The possible buffer size range is for an encoding buffer used to encode the streaming data. In some implementations, the possible buffer size range is calculated by calculating a propagated buffer size range based at least in part on: a buffer size range for the lost frame and a duration of the received frame, and then calculating an intersection of the propagated buffer size range and a maximum buffer size range for the received frame. In some implementations, the maximum buffer size range is selected based on a type of the streaming data. For example, different types of streaming data can have different maximum buffer size ranges (e.g., for audio, a first maximum buffer size range for voiced audio and a second maximum buffer size range for unvoiced audio).

At 540, a corrected timestamp range is calculated for the received network packet based at least in part on the received timestamp value and the possible buffer size range. In some implementations, calculating the corrected timestamp range comprises adjusting the possible buffer size range based on a duration of the received frame, and calculating the corrected timestamp range based on the adjusted possible buffer size range. A specific corrected timestamp value can then be selected form the corrected timestamp range (e.g., the lowest value in the range, the highest value in the range, or some value in-between). The corrected timestamp range and/or value can be used, for example, to adjust a jitter buffer.

Figure 6:
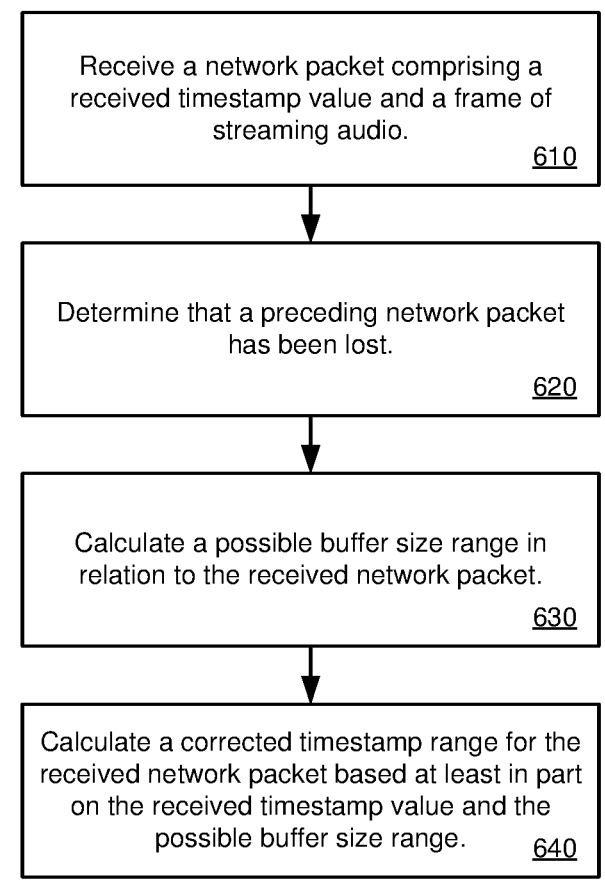
FIG. 6 is a flowchart of an example method for determining corrected timestamp ranges for streaming audio.

FIG. 6 is a flowchart of an example method 600 for determining corrected timestamp ranges for streaming audio. The streaming audio can be transmitted, for example, by a streaming network protocol, such as RTP. For example, the example method 600 can be performed by a computing device, such as receiving device 120 or receiving device 220.

At 610, a network packet is received comprising a received timestamp value and a frame of streaming audio. The received timestamp value has a fixed timestamp increment (e.g., an increment of 20 ms or some other fixed value).

At 620, a determination is made that the preceding network packet has been lost. For example, a time period for reception of the preceding network packet has expired.

At 630, a possible buffer size range is calculated in relation to the received network packet. The possible buffer size range is for an encoding buffer used to encode the streaming audio. In some implementations, the possible buffer size range is calculated by calculating a propagated buffer size range based at least in part on: a buffer size range for the lost frame and a duration of the received frame, and then calculating an intersection of the propagated buffer size range and a maximum buffer size range for the received frame. In some implementations, the maximum buffer size range is selected based on a type of the streaming audio. For example, different types of streaming audio can have different maximum buffer size ranges (e.g., a first maximum buffer size range for voiced audio and a second maximum buffer size range for unvoiced audio).

At 640, a corrected timestamp range is calculated for the received network packet based at least in part on the received timestamp value and the possible buffer size range. In some implementations, calculating the corrected timestamp range comprises adjusting the possible buffer size range based on a duration of the received frame, and calculating the corrected timestamp range based on the adjusted possible buffer size range. A specific corrected timestamp value can then be selected form the corrected timestamp range (e.g., the lowest value in the range, the highest value in the range, or some value in-between). The corrected timestamp range and/or value can be used, for example, to adjust a jitter buffer.

Computing Systems

Figure 7:
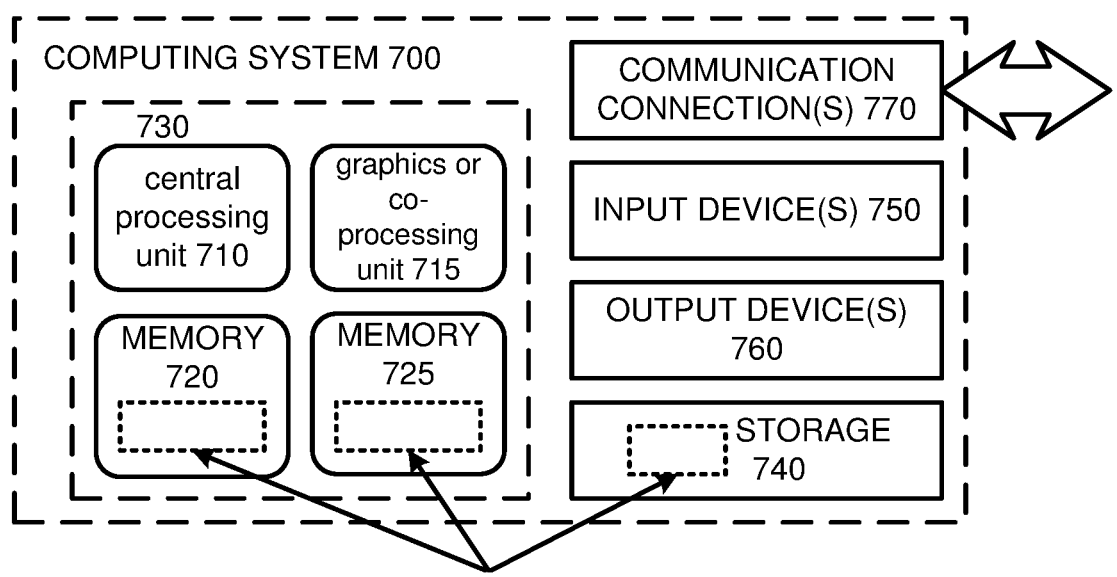
FIG. 7 is a diagram of an example computing system in which some described embodiments can be implemented.

FIG. 7 depicts a generalized example of a suitable computing system 700 in which the described technologies may be implemented. The computing system 700 is not intended to suggest any limitation as to scope of use or functionality, as the technologies may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC), or any other type of processor. A processing unit can also comprise multiple processors. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more technologies described herein, in the form of computer-executable instructions suitable for execution by the processing unit(s).

A computing system may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, CD-ROMs, DVDs, or any other medium which can be used to store information and which can be accessed within the computing system 700. The storage 740 stores instructions for the software 780 implementing one or more technologies described herein.

The input device(s) 750 may be a touch input device such as a keyboard, mouse, pen, or trackball, a voice input device, a scanning device, or another device that provides input to the computing system 700. For video encoding, the input device(s) 750 may be a camera, video card, TV tuner card, or similar device that accepts video input in analog or digital form, or a CD-ROM or CD-RW that reads video samples into the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The technologies can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Mobile Device

Figure 8:
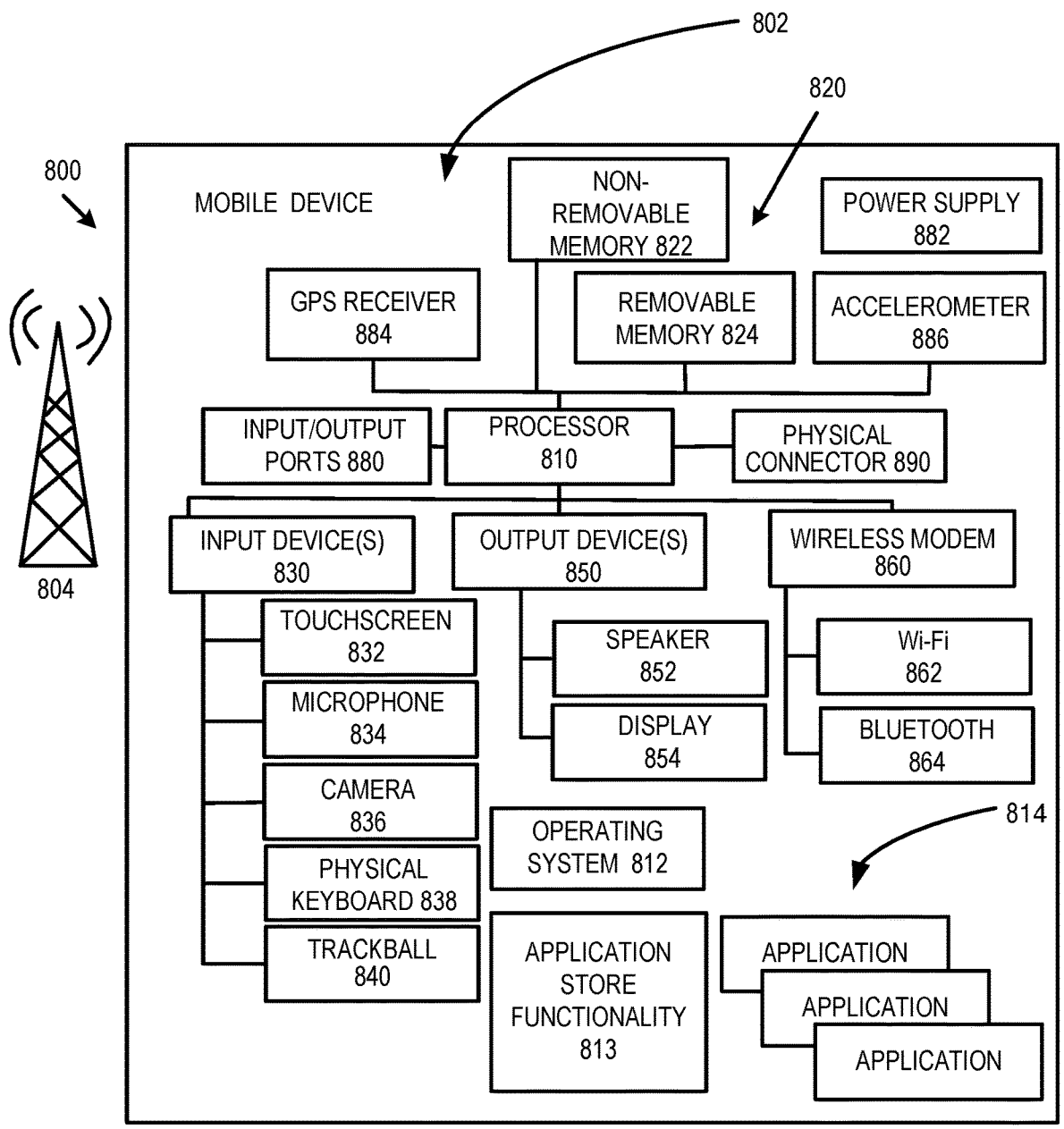
FIG. 8 is an example mobile device that can be used in conjunction with the technologies described herein.

FIG. 8 is a system diagram depicting an example mobile device 800 including a variety of optional hardware and software components, shown generally at 802. Any components 802 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 804, such as a cellular, satellite, or other network.

The illustrated mobile device 800 can include a controller or processor 810 (e.g., signal processor, microprocessor, ASIC, or other control and processing logic circuitry) for performing such tasks as signal coding, data processing, input/output processing, power control, and/or other functions. An operating system 812 can control the allocation and usage of the components 802 and support for one or more application programs 814. The application programs can include common mobile computing applications (e.g., email applications, calendars, contact managers, web browsers, messaging applications), or any other computing application. Functionality 813 for accessing an application store can also be used for acquiring and updating application programs 814.

The illustrated mobile device 800 can include memory 820. Memory 820 can include non-removable memory 822 and/or removable memory 824. The non-removable memory 822 can include RAM, ROM, flash memory, a hard disk, or other well-known memory storage technologies. The removable memory 824 can include flash memory or a Subscriber Identity Module (SIM) card, which is well known in GSM communication systems, or other well-known memory storage technologies, such as "smart cards." The memory 820 can be used for storing data and/or code for running the operating system 812 and the applications 814. Example data can include web pages, text, images, sound files, video data, or other data sets to be sent to and/or received from one or more network servers or other devices via one or more wired or wireless networks. The memory 820 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 800 can support one or more input devices 830, such as a touchscreen 832, microphone 834, camera 836, physical keyboard 838 and/or trackball 840 and one or more output devices 850, such as a speaker 852 and a display 854. Other possible output devices (not shown) can include piezoelectric or other haptic output devices. Some devices can serve more than one input/output function. For example, touchscreen 832 and display 854 can be combined in a single input/output device.

The input devices 830 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 812 or applications 814 can comprise speech-recognition software as part of a voice user interface that allows a user to operate the device 800 via voice commands. Further, the device 800 can comprise input devices and software that allows for user interaction via a user's spatial gestures, such as detecting and interpreting gestures to provide input to a gaming application.

A wireless modem 860 can be coupled to an antenna (not shown) and can support two-way communications between the processor 810 and external devices, as is well understood in the art. The modem 860 is shown generically and can include a cellular modem for communicating with the mobile communication network 804 and/or other radio-based modems (e.g., Bluetooth 864 or Wi-Fi 862). The wireless modem 860 is typically configured for communication with one or more cellular networks, such as a GSM network for data and voice communications within a single cellular network, between cellular networks, or between the mobile device and a public switched telephone network (PSTN).

The mobile device can further include at least one input/output port 880, a power supply 882, a satellite navigation system receiver 884, such as a Global Positioning System (GPS) receiver, an accelerometer 886, and/or a physical connector 890, which can be a USB port, IEEE 1394 (FireWire) port, and/or RS-232 port. The illustrated components 802 are not required or all-inclusive, as any components can be deleted and other components can be added.

Cloud-Supported Environment

Figure 9:
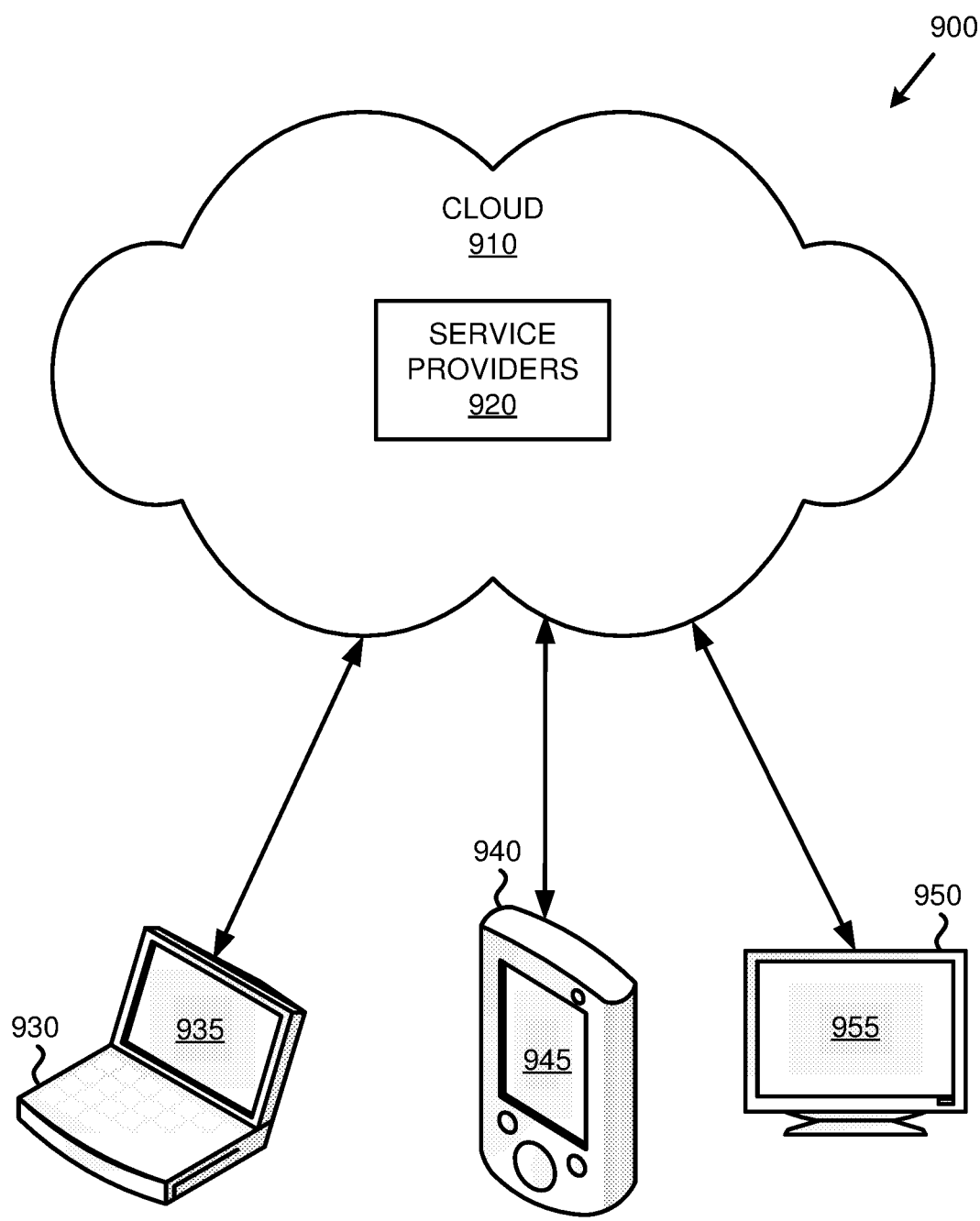
FIG. 9 is an example cloud-support environment that can be used in conjunction with the technologies described herein.

FIG. 9 illustrates a generalized example of a suitable cloud-supported environment 900 in which described embodiments, techniques, and technologies may be implemented. In the example environment 900, various types of services (e.g., computing services) are provided by a cloud 910. For example, the cloud 910 can comprise a collection of computing devices, which may be located centrally or distributed, that provide cloud-based services to various types of users and devices connected via a network such as the Internet. The implementation environment 900 can be used in different ways to accomplish computing tasks. For example, some tasks (e.g., processing user input and presenting a user interface) can be performed on local computing devices (e.g., connected devices 930, 940, 950) while other tasks (e.g., storage of data to be used in subsequent processing) can be performed in the cloud 910.

In example environment 900, the cloud 910 provides services for connected devices 930, 940, 950 with a variety of screen capabilities. Connected device 930 represents a device with a computer screen 935 (e.g., a mid-size screen). For example, connected device 930 could be a personal computer such as desktop computer, laptop, notebook, netbook, or the like. Connected device 940 represents a device with a mobile device screen 945 (e.g., a small size screen). For example, connected device 940 could be a mobile phone, smart phone, personal digital assistant, tablet computer, and the like. Connected device 950 represents a device with a large screen 955. For example, connected device 950 could be a television screen (e.g., a smart television) or another device connected to a television (e.g., a set-top box or gaming console) or the like. One or more of the connected devices 930, 940, 950 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 900. For example, the cloud 910 can provide services for one or more computers (e.g., server computers) without displays.

Services can be provided by the cloud 910 through service providers 920, or through other providers of online services (not depicted). For example, cloud services can be customized to the screen size, display capability, and/or touchscreen capability of a particular connected device (e.g., connected devices 930, 940, 950).

In example environment 900, the cloud 910 provides the technologies and solutions described herein to the various connected devices 930, 940, 950 using, at least in part, the service providers 920. For example, the service providers 920 can provide a centralized solution for various cloud-based services. The service providers 920 can manage service subscriptions for users and/or devices (e.g., for the connected devices 930, 940, 950 and/or their respective users).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 7, computer-readable storage media include memory 720 and 725, and storage 740. By way of example and with reference to FIG. 8, computer-readable storage media include memory and storage 820, 822, and 824. The term computer-readable storage media does not include signals and carrier waves. In addition, the term computer-readable storage media does not include communication connections, such as 770, 860, 862, and 864.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

What is claimed is:

1. A computing device comprising:
   a processor;
   a network connection; and
   memory;
   the computing device configured, via computer-executable instructions, to perform operations for determining corrected timestamp ranges for streaming data, wherein the streaming data is encoded using frames with a variable frame size, the operations comprising:
      receiving, via the network connection, a network packet comprising a received timestamp value and a frame of streaming data, wherein the received timestamp value has a fixed timestamp increment;
      determining that a preceding network packet, comprising a preceding frame of streaming data, has been lost;
      calculating a possible buffer size range in relation to the received network packet, wherein the possible buffer size range is for an encoding buffer used to encode the streaming data; and
      calculating a corrected timestamp range for the received network packet based at least in part on the received timestamp value and the possible buffer size range.

2. The computing device of claim 1, the operations further comprising:
   adjusting a jitter buffer based on the corrected timestamp range, wherein the jitter buffer is used to buffer network packets, comprising frames of the streaming data, received from a transmitting computing device via the network connection.

3. The computing device of claim 1 wherein the streaming data is received via real-time transport protocol (RTP), and wherein the received timestamp value is an RTP timestamp value.

4. The computing device of claim 1 wherein calculating the possible buffer size range comprises:
   calculating a propagated buffer size range based at least in part on: a buffer size range for the lost frame and a duration of the received frame; and
   calculating an intersection of the propagated buffer size range and a maximum buffer size range for the received frame.

5. The computing device of claim 1 wherein calculating the possible buffer size range comprises:
   determining a type of streaming data for the received frame from a plurality of supported types of streaming data, wherein each of the plurality of supported types of streaming data has a different maximum buffer size range;
   based on the determined type of streaming data, selecting a corresponding maximum buffer size range;
   calculating a propagated buffer size range based at least in part on: a buffer size range for the lost frame and a duration of the received frame; and
   calculating an intersection of the propagated buffer size range and the selected maximum buffer size range for the received frame.

6. The computing device of claim 1 wherein the streaming data comprises streaming audio data, and wherein the streaming audio data is encoded, at least in part, using pitch cycles in which each of one or more frames contains an integer number of pitch cycles.

7. The computing device of claim 1 wherein calculating the corrected timestamp range comprises:
   adjusting the received timestamp value by the fixed timestamp increment, the duration of the received frame, and the possible buffer size range.

8. The computing device of claim 1 wherein calculating the corrected timestamp range is performed according to the following equation:

corrected timestamp range=received timestamp value+fixed timestamp increment−duration of received frame−possible buffer size range.

9. The computing device of claim 1 wherein calculating the possible buffer size range is performed according to the following equation:

possible buffer size range=buffer size range of lost frame+fixed timestamp increment−duration of received frame ∩ maximum buffer size range of received frame.

10. A method, implemented by a computing device, for determining corrected timestamp ranges for streaming audio, wherein the streaming audio is encoded using frames with a variable frame size, the method comprising:
   receiving a network packet comprising a received timestamp value and a frame of streaming audio, wherein the received timestamp value has a fixed timestamp increment;
   determining that a preceding network packet, comprising a preceding frame of streaming audio, has been lost;
   calculating a possible buffer size range in relation to the received network packet, wherein the possible buffer size range is for an encoding buffer used to encode the streaming audio; and
   calculating a corrected timestamp range for the received network packet based at least in part on the received timestamp value and the possible buffer size range.

11. The method of claim 10, further comprising:
   adjusting a jitter buffer based on the corrected timestamp range, wherein the jitter buffer is used to buffer network packets, comprising frames of the streaming audio, received from a transmitting computing device via a network connection.

12. The method of claim 10 wherein the streaming data is received via real-time transport protocol (RTP), and wherein the received timestamp value is an RTP timestamp value.

13. The method of claim 10 wherein calculating the possible buffer size range comprises:
   calculating a propagated buffer size range based at least in part on: a buffer size range for the lost frame and a duration of the received frame; and
   calculating an intersection of the propagated buffer size range and a maximum buffer size range for the received frame.

14. The method of claim 10 wherein calculating the possible buffer size range comprises:
   determining a type of streaming audio for the received frame from a plurality of supported types of streaming audio, wherein the plurality of types of streaming audio comprise:
      a voiced type with a first maximum buffer size range; and
      an unvoiced type with a second maximum buffer size range different from the first buffer size range;
   based on the determined type of streaming audio, selecting a corresponding maximum buffer size range;

calculating a propagated buffer size range based at least in part on: a buffer size range for the lost frame and a duration of the received frame; and calculating an intersection of the propagated buffer size range and the selected maximum buffer size range for the received frame.

15. The method of claim 10 wherein calculating the corrected timestamp range comprises:

adjusting the received timestamp value by the fixed timestamp increment, the duration of the received frame, and the possible buffer size range.

16. A method, implemented by a computing device, for determining corrected timestamp ranges for streaming audio, wherein the streaming audio is encoded using frames with a variable frame size, the method comprising:

receiving a network packet comprising a received timestamp value and a frame of streaming audio, wherein the received timestamp value has a fixed timestamp increment;

determining that a preceding network packet, comprising a preceding frame of streaming audio, has been lost;

calculating a possible buffer size range in relation to the received network packet, wherein the possible buffer size range is for an encoding buffer used to encode the streaming audio;

calculating a corrected timestamp range for the received network packet based at least in part on the received timestamp value and the possible buffer size range; and adjusting a jitter buffer used to store received network packets of the streaming audio based on the corrected timestamp range.

17. The method of claim 16 wherein the streaming data is received via real-time transport protocol (RTP), and wherein the received timestamp value is an RTP timestamp value.

18. The method of claim 16, wherein calculating the possible buffer size range comprises:

calculating a propagated buffer size range based at least in part on: a buffer size range for the lost frame and a duration of the received frame; and calculating an intersection of the propagated buffer size range and a maximum buffer size range for the received frame.

19. The method of claim 16 wherein calculating the possible buffer size range comprises:

determining a type of streaming data for the received frame from a plurality of supported types of streaming data, wherein each of the plurality of supported types of streaming data has a different maximum buffer size range;

based on the determined type of streaming data, selecting a corresponding maximum buffer size range;

calculating a propagated buffer size range based at least in part on: a buffer size range for the lost frame and a duration of the received frame; and calculating an intersection of the propagated buffer size range and the selected maximum buffer size range for the received frame.

20. The method of claim 16 wherein calculating the corrected timestamp range comprises:

adjusting the received timestamp value by the fixed timestamp increment, the duration of the received frame, and the possible buffer size range.

* * * * *